United States Patent
Pardo, Jr.

(10) Patent No.: US 9,869,081 B1
(45) Date of Patent: Jan. 16, 2018

(54) TOILET FLANGE COVER SYSTEM

(71) Applicant: John Pardo, Jr., Orlando, FL (US)

(72) Inventor: John Pardo, Jr., Orlando, FL (US)

(73) Assignee: John Parde, III, Casselberry, FL (US)

( * ) Notice: Subject to any disclaimer, the term of this patent is extended or adjusted under 35 U.S.C. 154(b) by 0 days.

(21) Appl. No.: 15/229,755

(22) Filed: Aug. 5, 2016

(51) Int. Cl.
  *E03D 11/16* (2006.01)
  *F16L 55/115* (2006.01)

(52) U.S. Cl.
  CPC .......... *E03D 11/16* (2013.01); *F16L 55/1157* (2013.01)

(58) Field of Classification Search
  CPC .................................................. E03D 11/16
  USPC .......... 138/89, 90, 96 R; 4/252.1–252.5, 295
  See application file for complete search history.

(56) References Cited

U.S. PATENT DOCUMENTS

| | | | | |
|---|---|---|---|---|
| 4,092,882 A * | 6/1978 | Whitmore | ................ | B25B 13/00 33/371 |
| 4,223,697 A * | 9/1980 | Pendleton | ................ | F16K 15/03 137/527.8 |
| 4,233,697 A * | 11/1980 | Cornwall | ................ | E03D 11/16 138/89 |
| 5,329,971 A * | 7/1994 | Condon | ................ | E03D 11/16 138/89 |
| 5,503,189 A * | 4/1996 | Lamendola | ........... | F16L 57/005 138/89.3 |
| 5,996,134 A * | 12/1999 | Senninger | ............... | E03D 11/16 138/96 R |
| 6,085,362 A * | 7/2000 | Huber | ..................... | E03D 11/16 138/96 R |
| 6,725,468 B2 * | 4/2004 | Molina | ................... | E03D 11/16 138/89 |
| 8,347,906 B1 * | 1/2013 | Ismert | ..................... | B08B 17/04 137/15.01 |
| 8,409,433 B2 * | 4/2013 | Worth | ....................... | C02F 1/68 210/163 |
| 9,428,900 B2 * | 8/2016 | Wroblewski | .......... | E03F 5/0407 |
| 2012/0240319 A1 * | 9/2012 | Yssel | ...................... | E03D 11/16 4/252.1 |
| 2012/0261024 A1 * | 10/2012 | Ketzer | .................. | F16L 57/005 138/96 R |

* cited by examiner

*Primary Examiner* — Allana Lewin Bidder
*Assistant Examiner* — Nicholas Ros
(74) *Attorney, Agent, or Firm* — Sandra L. Layer

(57) ABSTRACT

A toilet flange cover system for temporarily covering a toilet flange and opening during periods of construction and remodeling when the toilet is not installed. A cover is fabricated of a rigid plastic material and formed with a generally circular shape. Diametrically opposed locking posts are integrated into the bottom of the cover having enlarged heads and can be removably received in the bolt slots for coupling the cover to a toilet flange when covering the opening and uncoupling from the toilet flange to facilitate accessing the opening. A handle aids in the coupling and uncoupling of the cover and a gasket is placed between the cover and flange to seal the opening when the cover is coupled to the toilet flange.

3 Claims, 4 Drawing Sheets

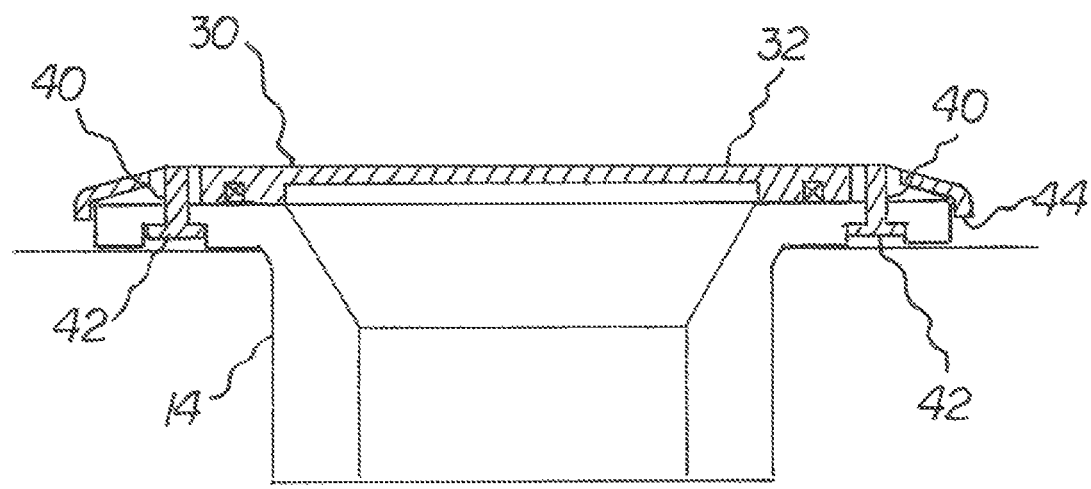
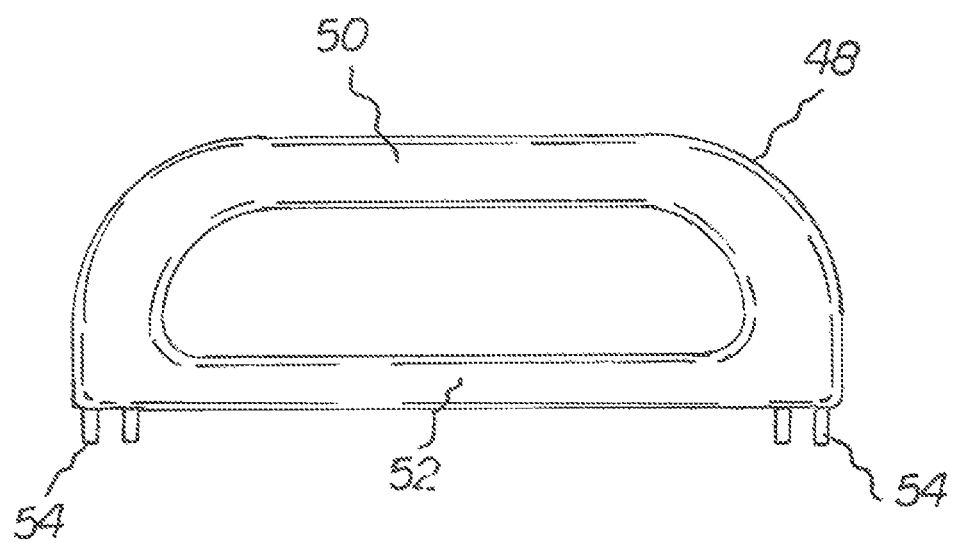

TOILET FLANGE COVER SYSTEM

BACKGROUND OF THE INVENTION

Field of the Invention

The present invention relates to a toilet flange cover system and more particularly pertains to temporarily covering a toilet flange opening during periods of construction.

Description of the Prior Art

The use of toilet flange covers is known in the prior art. More specifically, toilet flange covers previously devised and utilized for the purpose of covering the toilet opening during periods of construction are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a toilet flange cover system that allows for covering a toilet flange in a bathroom floor during construction, restricting access to the opening to provide a protective covering for safety, to prevent vapors, gases and unwanted pests and for abating accidental dropping of objects into the toilet opening.

In this respect, the toilet flange cover system according to the present invention substantially departs from the conventional concepts and designs of the prior art, and in doing so provides an apparatus primarily developed for the purpose of covering a toilet flange in a bathroom floor during construction, restricting access to the to the opening to provide a protective covering for safety, to prevent vapors, gases and unwanted pests and for abating accidental dropping of objects into the toilet opening.

Therefore, it can be appreciated that there exists a continuing need for a new and improved toilet flange cover system which can be used for covering a toilet flange in a bathroom floor during construction, restricting access to the to the opening to provide a protective covering for safety, to prevent vapors, gases and unwanted pests and for abating accidental dropping of objects into the toilet opening. In this regard, the present invention substantially fulfills this need.

SUMMARY OF THE INVENTION

In view of the foregoing disadvantages inherent in the known types of toilet flange covers now present in the prior art, the present invention provides an improved toilet flange cover system. As such, the general purpose of the present invention, which will be described subsequently in greater detail, is to provide a new and improved toilet flange cover system and method which has all the advantages of the prior art and none of the disadvantages.

To attain this, from a broad perspective, the present invention essentially comprises a cover fabricated of a rigid plastic material formed with a generally circular shape. The cover has an upper face and a lower face. Diametrically opposed locking posts project downward from the lower face. Each locking post has an enlarged head for being removably received in the bolt slot of a toilet flange for coupling to a toilet flange when covering a toilet flange hole and uncoupling from the toilet flange to facilitate accessing the hole.

One feature of the system are finger holes used to rotate and lower or lift the cover when coupling or uncoupling the cover from the toilet flange.

An option feature of the system is a handle to aid in the coupling and uncoupling of the cover to the toilet flange.

Another optional feature is a gasket to seal the opening when the cover is coupled to the toilet flange.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved toilet flange cover system which has all of the advantages of the prior art toilet flange covers and none of the disadvantages.

It is another object of the present invention to provide a new and improved toilet flange cover system which may be easily and efficiently manufactured and marketed.

It is a further object of the present invention to provide a new and improved toilet flange cover system which is of durable and reliable constructions providing a protective cover to an exposed toilet flange.

An even further object of the present invention is to provide a new and improved toilet flange cover system which is susceptible of a low cost of manufacture with regard to both materials and labor, and which accordingly is then susceptible of low prices of sale to the consuming public, thereby making such toilet flange cover system economically available to the buying public.

An additional object of the present invention is to provide a system that safely prevents trips and falls resulting from an open hole or a raised cover.

It is a still further object of the present invention to provide a reusable cover which is easily installed and removed.

Lastly, it is an object of the present invention to provide a toilet flange cover system in order to restrict access to the to the opening to prevent vapors, gases and unwanted pests from coming up into the room and for abating accidental dropping of objects into the toilet opening.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side cross-sectional view of a toilet flange system installed on a toilet flange taken along lines 2-2 of FIG. 1.

FIG. 3 is a plan view of a handle for a toilet flange system taken along lines 3-3 of FIG. 1.

The same reference numerals refer to the same parts throughout the various Figures.

DESCRIPTION OF THE PREFERRED EMBODIMENT

Figure 1:
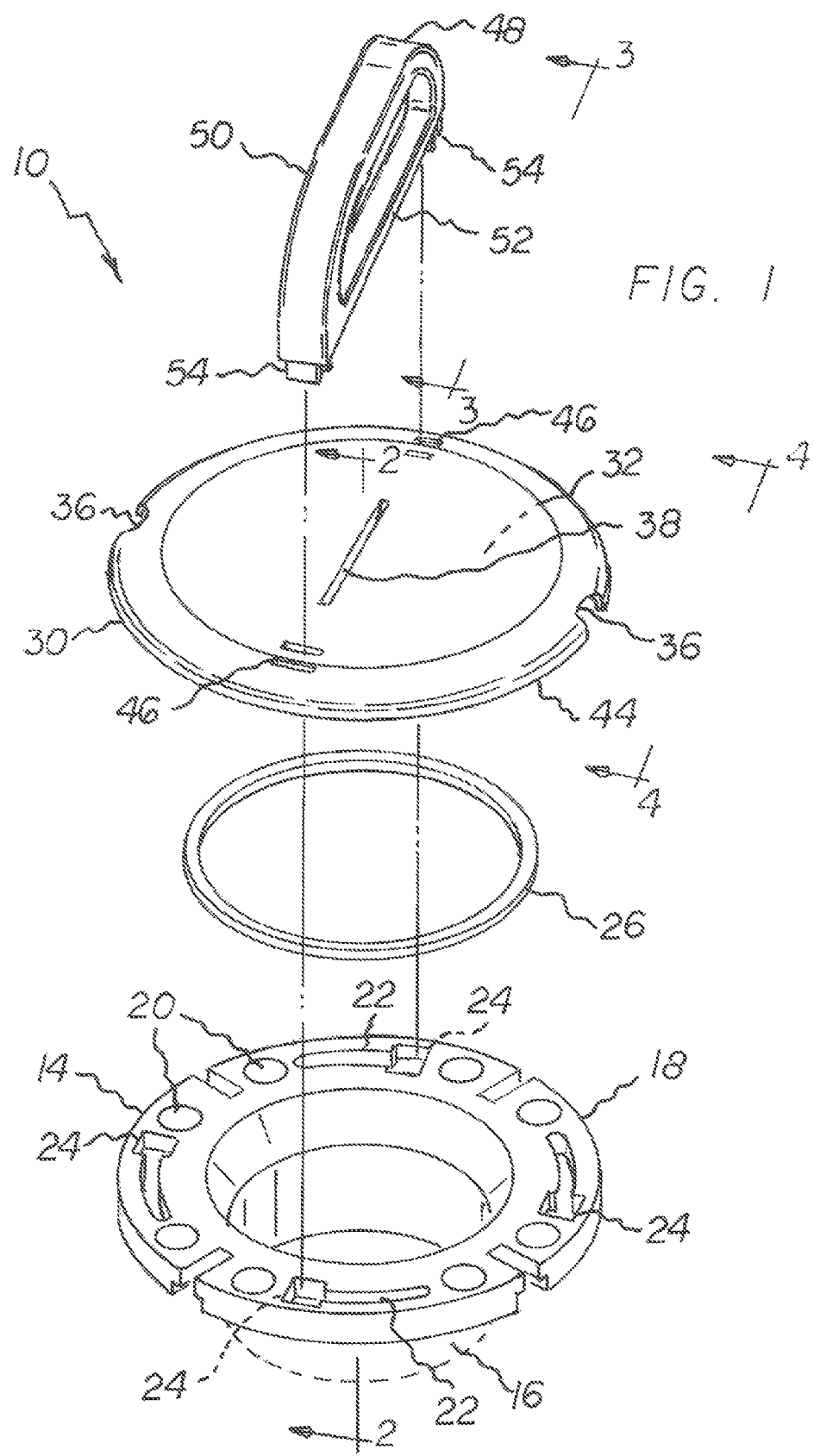
FIG. 1 is an exploded view of a toilet flange cover system constructed in accordance with the principles of the present invention.
Figure 4:
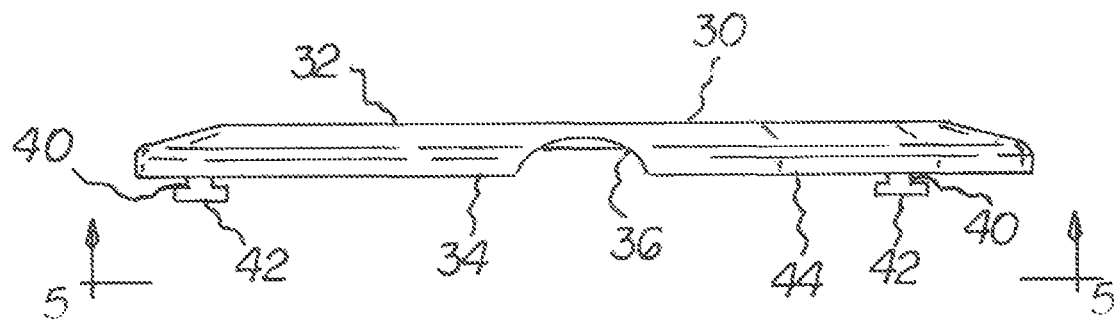
FIG. 4 is a side view of a toilet flange cover taken along lines 4-4 of FIG. 1.
Figure 5:
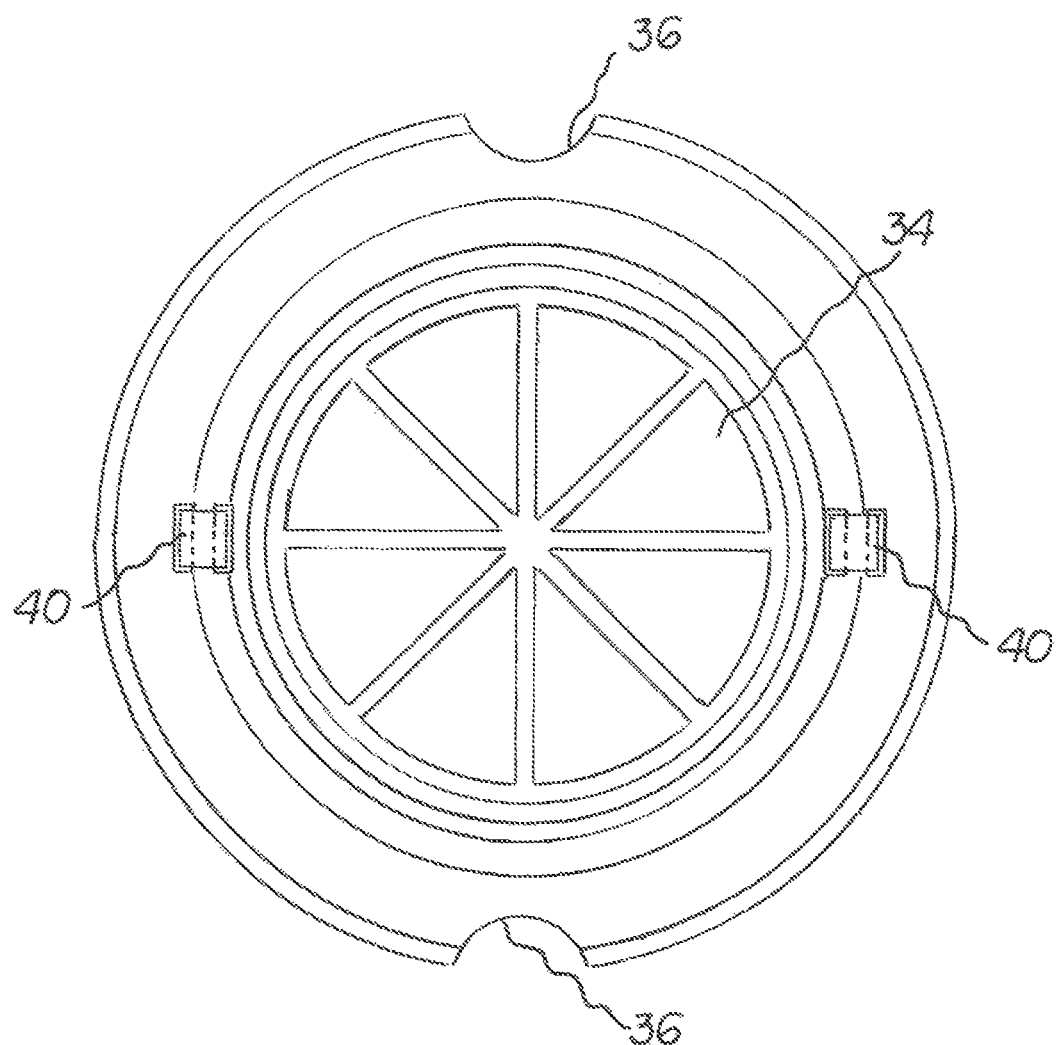
FIG. 5 is a bottom view of a toilet flange cover taken along lines 5-5 of FIG. 4.
Figure 6:
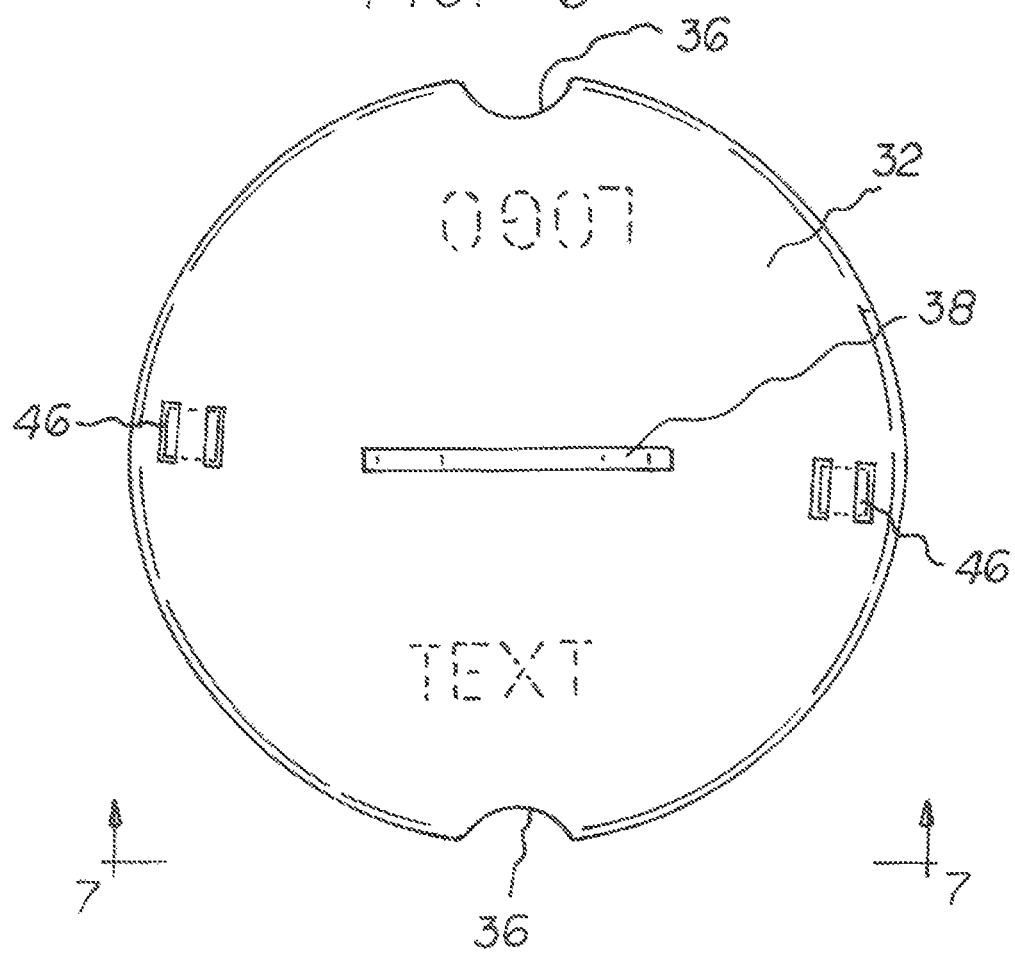
FIG. 6 is a top view of an alternate embodiment of toilet flange cover without the peripheral lip constructed in accordance with the principles of the current invention.
Figure 7:
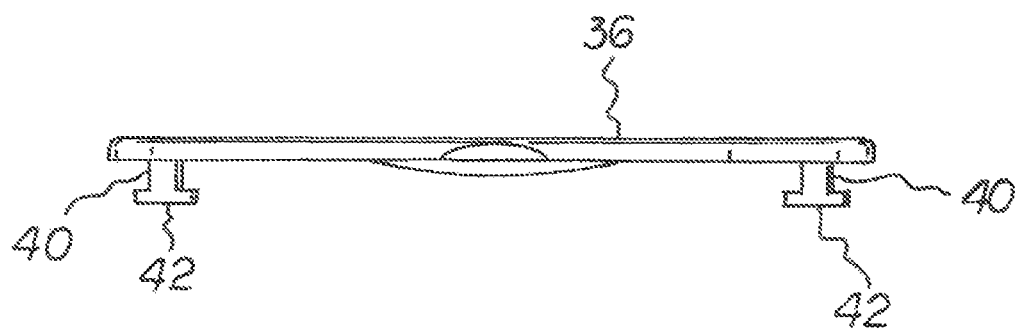
FIG. 7 is a side view of a toilet flange cover taken along lines 7-7 of FIG. 6.

With reference now to the drawings, and in particular to FIGS. 1 though 7 thereof, the preferred embodiments of the new and improved toilet flange cover system embodying the principles and concepts of the present invention and generally designated by the reference numeral 10 will be described.

The present invention, the toilet flange cover system 10 is comprised of a plurality of components. Such components in their broadest context include a cover, an optional handle for easier handling and a gasket to seal the opening. Such components are individually configured and correlated with respect to each other so as to attain the desired objective.

From a specific perspective, the preferred embodiment of the invention of the present application is a toilet flange cover system for covering a toilet flange in a bathroom floor during construction, restricting access to the to the opening to prevent vapors, gases and unwanted pests and for abating accidental dropping of objects into the toilet opening. The preferred embodiment is designed to be removably coupled to an installed toilet flange 14 fabricated of a rigid plastic material and having a cylindrical section 16 below extending into the bathroom hole and an annular section 18 above extending radially from the cylindrical section. The toilet flange has a plurality of apertures 20 for attachment. The toilet flange formed with diametrically opposed arcuate slots 22, each slot having an enlarged section 24 for receiving a bolt head for attaching to a toilet.

In one preferred embodiment, an optional gasket 26 is positioned on the upper section of the toilet flange radially interior of the apertures and the recesses and radially exterior of the cylindrical section.

A cover 30 is fabricated of a rigid plastic material formed with a generally circular periphery. The cover has an upper face 32 and a lower face 34. Two diametrically opposed finger holes 36 are formed in the generally circular periphery to facilitate rotating and lifting of the cover. An elongated groove 38 is formed in the upper face of the cover for the purpose of inserting a screwdriver to rotate the cover.

The lower face has diametrically opposed locking posts 40, each locking post having an enlarged head 42 for being removably received in the enlarged portion of the associated arcuate slot for coupling to the flange when covering the hole and uncoupling from the flange to facilitate accessing the hole.

In an additional preferred embodiment the generally circular periphery is formed with a downward lip 44 position able exterior of the toilet flange when the cover is coupled to the toilet flange.

In another preferred embodiment, the cover has diametrically opposed slots 46 rotationally spaced by 90 degrees from the finger holes and radially interior of the finger holes. An optional handle 48 is fabricated of a rigid plastic material and formed with an arcuate upper extent 50 and a planar lower extent 52 which can be positioned over and removably coupled to the upper face of the cover. The handle has two ends, each end formed with prongs 54 formed to fit into the diametrically opposed slots on the cover. The opening between the upper extent and the lower extent allowing for receiving a hand of a user to grip the handle, turning and lifting the cover for installation and removal from the toilet flange.

When constructing or remodeling bathrooms it is common for installed toilet flanges to be exposed during construction activities prior to the installation of the actual toilet. This leaves the toilet drain opening exposed allowing potentially hazardous vapors, gases or pests to enter from the opening or construction debris to fall into the opening resulting in future problems from blockages. The opening poses a safety hazard potentially causing trips or falls when workers step on the opening. The toilet flange cover system of the present invention is designed to be a safe, reusable, convenient, and durable means of securing and sealing off an otherwise exposed toilet flange opening. The generally flat cover reduces the potential for trips and falls and prevents materials and pests from entering or existing the opening during the construction activities. The cover protects the flange, preventing issues resulting from a broken or damaged flange when the toilet is eventually installed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A toilet flange cover system for covering a standard toilet flange installed in a bathroom floor during construction, restricting access to the to the opening to prevent vapors, gases and unwanted pests and for abating accidental dropping of objects into the toilet opening, the system comprising, in combination:

a standard toilet flange fabricated of a rigid plastic material having a cylindrical section below extending into the bathroom hole, the standard toilet flange having an annular section above extending radially from the cylindrical section, the annular section having a first exterior diameter, the standard toilet flange having a plurality of apertures for attachment, the standard toilet flange having diametrically opposed arcuate slots, each slot having an enlarged section for receiving a bolt head for attaching to a toilet, each slot having a first height and a first width, the enlarged section having a second width larger than the first width;

a gasket positioned on the upper section of the standard toilet flange radially interior of the apertures and the recesses and radially exterior of the cylindrical section;

a cover fabricated of a rigid plastic material formed with a generally circular periphery, the cover having a second diameter, the second diameter being greater than the first diameter, the cover having an upper face and a lower face, the upper face having a smooth upper surface having no upward projections, the generally circular periphery having two diametrically opposed finger holes to facilitate rotating and lifting, an elongated groove formed in the upper face for the purpose of inserting a screw driver to rotate the cover;

the lower face having diametrically opposed locking posts, each locking post formed with a solid unitary structure integral to the cover, each locking post having a shaft and an enlarged head, the shaft having a second height slightly longer than the first height, the enlarged head extending radially from the shaft and having a diameter greater that the first width and narrower than the second width, the enlarged head of each locking post adapted for being removably received in an enlarged portion of an associated arcuate slot of the standard toilet flange for coupling to the standard toilet flange when covering the hole and when uncoupling from the standard toilet flange to facilitate accessing the hole;

the upper face having diametrically opposed dual slots rotationally spaced by 90 degrees from the finger holes, the dual slots being radially interior of the finger holes and vertically in line with the locking posts straddling each shaft; and a handle fabricated of a rigid plastic material, the handle having an arcuate upper extent and a planar lower extent positioned over and removably coupled to the upper face of the cover, the handle having two ends, each end formed with dual prongs, the dual prongs formed to fit into the diametrically opposed dual slots, an opening between the upper extent and the lower extent for receiving a hand of a user to rotate the cover for removal when uncoupling from the standard toilet flange to facilitate accessing the hole and coupling to the standard toilet flange when covering the hole.

2. The toilet flange cover system of claim 1 wherein the cover is composed of a rigid material taken from a class of rigid materials including plastic, nylon, rubber and polymers.

3. The toilet flange cover system of claim 1 wherein the generally circular periphery further comprises a downward lip positionable exterior of the standard toilet flange when the cover is coupled to the standard toilet flange.

* * * * *